Patented Aug. 4, 1931

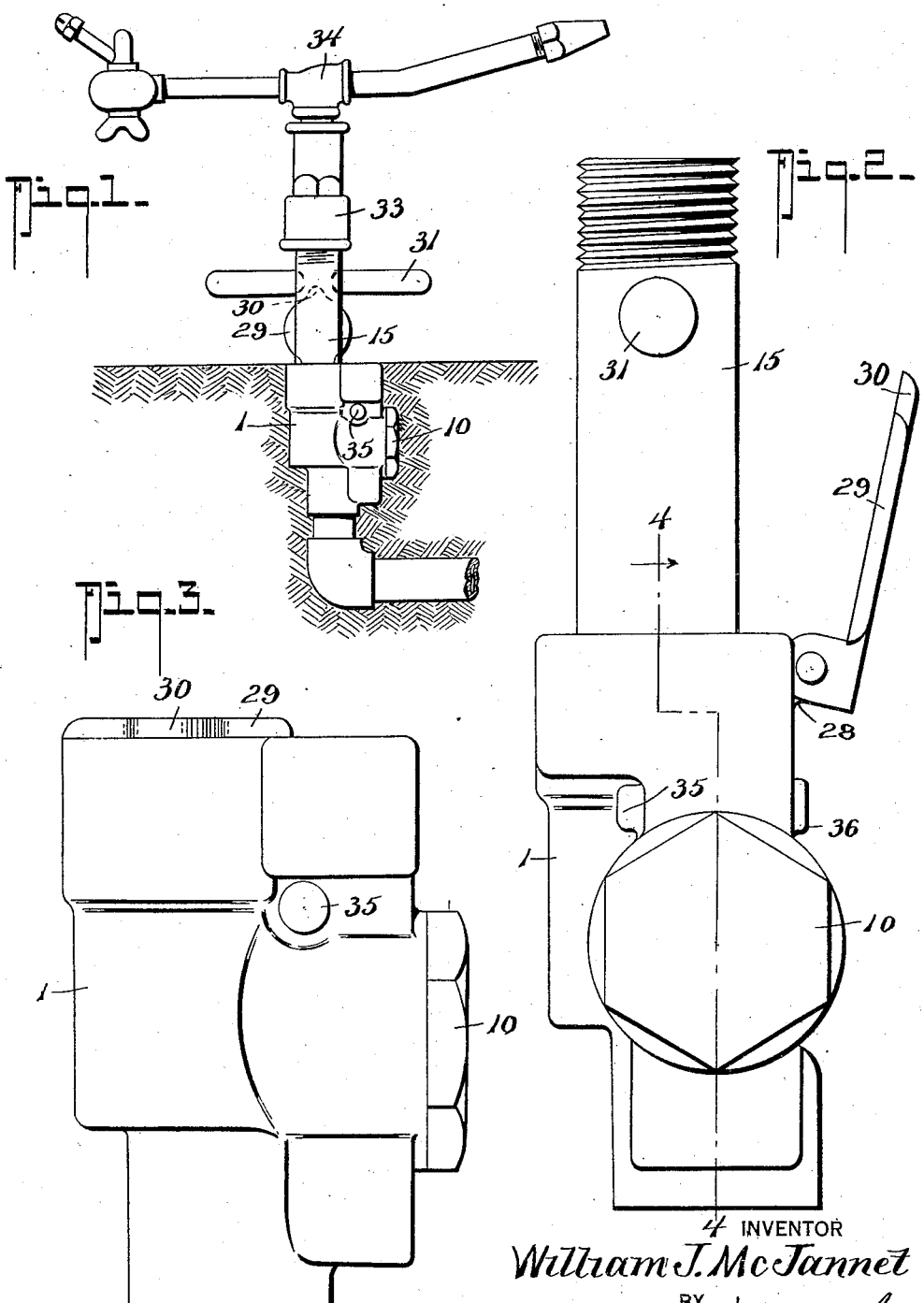

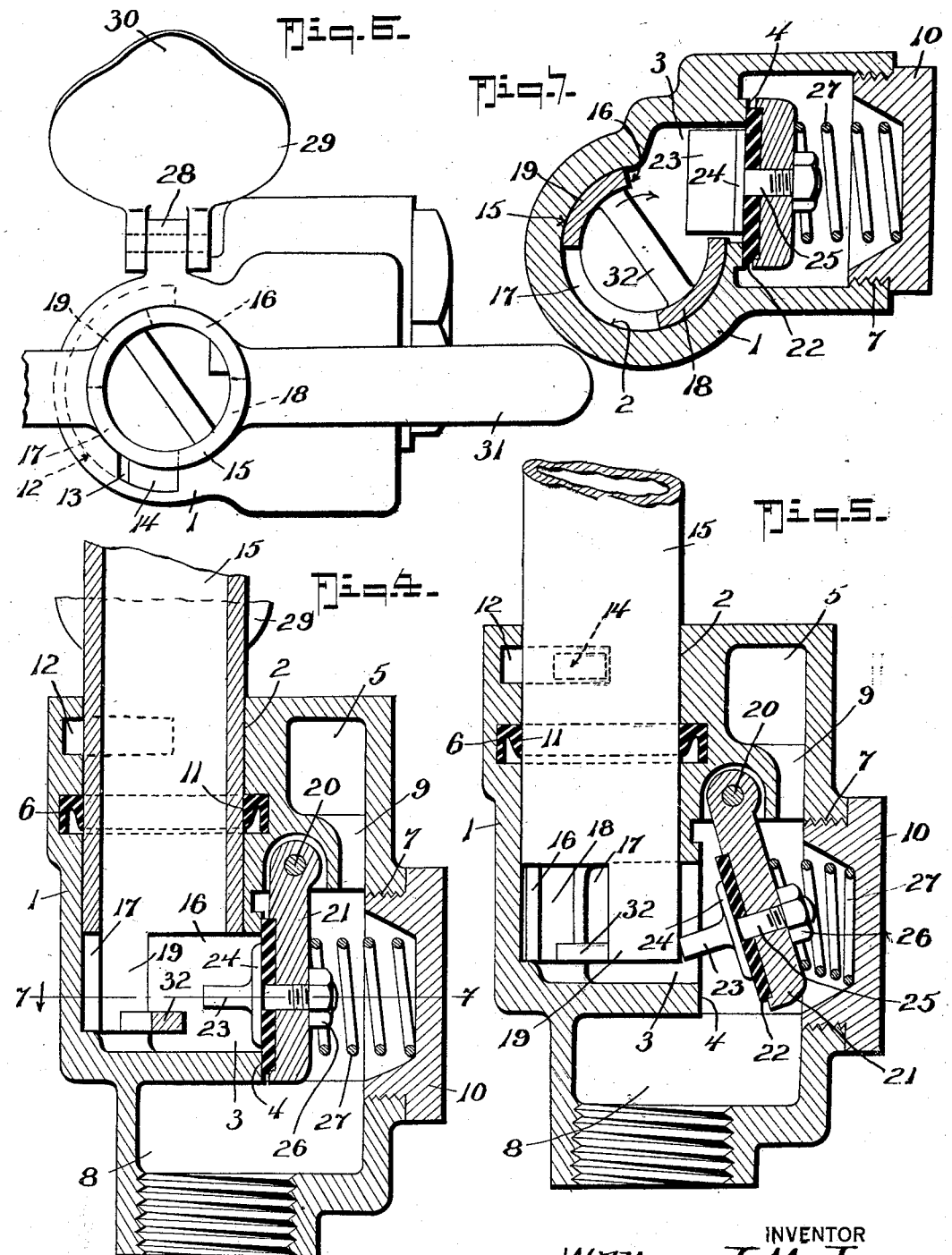

1,817,830

UNITED STATES PATENT OFFICE

WILLIAM J. McJANNET, OF SEATTLE, WASHINGTON, ASSIGNOR TO ECONOMY IRRIGATION COMPANY, INC., OF SEATTLE, WASHINGTON, A CORPORATION OF WASHINGTON

QUICK COUPLING VALVE DEVICE

Application filed August 13, 1930. Serial No. 475,035.

My invention relates to valve devices for controlling the flow of fluids through pipes or conduits and while it especially has been designed for use in combination with lawn sprinklers of the general type disclosed in United States Letters Patent No. 1,721,237, issued July 16, 1929, it is obviously useful in almost any place where shut-off and control valves are employed, as for instance in oil and gas conduits, hose pipes, steam conduits, etc.

Further, it is an object to provide a device of the character specified which is particularly useful in connection with sprinkler heads or hoseless sprinkling systems for the irrigation of golf courses or any large areas.

Further, it is an object to provide a valve device that may be screwed onto the piping system below the ground level and when capped it will be strong enough to bear the weight of a tractor or lawn mower as the same passes thereover.

Further, it is an object to provide a device by the employment of which it will be possible to turn on the full stream of water (or less if desired), a thing that does not seem possible with the snap valves and couplings at present on the market as they only appear to allow about one-half of the water to pass for which the opening is theoretically designed.

Further, it is an object to provide a quick coupling valve device which will allow for a full opening from inlet to outlet, thus permitting the water to pass without reduction of volume or pressure.

Further, it is an object to provide a quick coupling valve device in which the shut-off valve proper closes with the water pressure and in which provision is made to avoid the water hammer now so prevalent in other quick shutting valves which are closed with the water pressure.

Further, it is an object of the invention to provide a valve device of the character stated of a compact structure in which the flap valve is easily accessible if it becomes necessary to put in a new seat.

Further, it is an object of the invention to provide a valve device of the character stated in which the body of the device is made free from joints, i. e., is cast all in one piece.

Further, it is an object to provide a valve device so constructed that the valve proper is offset and the shock absorbing chamber is also offset to prevent water hammer, whereby a compact structure is provided which will fit into the ordinary pipe or box in the ground in the way in which most golf courses use these valves.

Further, it is an object of the invention to provide a quick coupling valve device especially adapted to lawn sprinklers, in which device a removable quill carries the sprinkler head and sprinkler and is adapted to enter the casing of the valve to open the valve proper, provision being made to lock the quill to the casing while the valve is in the open position; the casing is provided with a hinged lid to close the quill receiving opening when the quill is withdrawn, the lid being liftable by the toe of one's foot.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a side elevation of the invention in use, the parts being in the position they assume just before the quill is turned to open the valve.

Figure 2 is an elevation taken at an angle of ninety degrees to the position shown in Figure 1 and illustrating the invention itself on a larger scale than that of Figure 1.

Figure 3 is an elevation similar to Figure 1 on the scale of Figure 2, showing the device after the quill has been removed and the cover closed.

Figure 4 is a vertical section on the line 4—4 of Figure 2 with the parts in position before the quill is turned to lock it to the casing and open the valve proper.

Figure 5 is a view similar to Figure 4, the quill having been turned and interlocked with the casing and having opened the flap valve.

Figure 6 is a top plan view of the part shown in Figure 4.

Figure 7 is a horizontal section on the line 7—7 of Figure 4.

In the drawings, in which like numerals of reference designate like parts in all of the figures, 1 represents the casing which is provided with an opening 2 for the reception of the quill 15 hereinafter again referred to and which is also provided with a passageway between the opening or outlet chamber 2 and the inlet chamber 8, the passage 3 being provided with a valve seat 4 against which the flap valve hereinafter again referred to is adapted to engage.

The casing 1 is provided with an offset air chamber 5 that is in communication with the inlet chamber 8 through the medium of the passage 9.

6 designates a sealing ring groove in the casing 1 in which is an inverted U-shaped sealing ring 11 of flexible material to effect a water-tight joint between the casing 1 and the quill 15 when the latter is in place, see Figures 4 and 5.

Opposite the valve seat 4 the casing 1 is drilled and tapped as at 7 to receive the removable plug 10 which is socketed to receive the valve spring 27. The plug 10 is designed to provide means whereby access to the flap valve and its seat may be conveniently had and the opening 7 provides a means by which the valve may be introduced or removed from the casing at will.

Adjacent the upper end of the opening 2 the casing 1 is provided with a bayonet slot consisting of the entrance 13 and the arcuate portion 12 to receive the locking lug 14 that is cast or otherwise formed on the quill 15. The quill 15 is in the nature of a pipe section, the upper end of which is threaded to receive the coupling member 33 on which the sprinkler head 34 is mounted.

The quill is provided with a handle 31 by means of which it may be turned and it is provided at its lower end with two cut-away portions opposite each other numbered respectively 16 and 17 in the drawings. These cut-out portions leave two abutments or projecting portions 18 and 19 respectively which are reinforced at their lower ends by a bridge bar 32. The purpose of these abutments will presently be explained.

20 designates the valve hinge pin which has one end seated in a socket 35 in the casing, the pin being introduced through an opening 36 in the casing opposite the socket 35 and secured against displacement in any suitable way.

The flap valve comprises a body 21 recessed to receive a leather or other suitable washer 22 which is held in place by the cap 24 on the end of a stud bolt 25 that passes through the washer and through the body of the valve and is fastened by a suitable nut 26. The cap 24 carries a projection 23 that is adapted to be engaged by the abutment 19 as the quill 15 is turned in the direction of the arrow in Figure 7.

28 is a lug on the casing 1 to which is hinged a flap valve 29 that is adapted to close the outlet end of the opening 2 when the quill 15 is withdrawn, the valve 29 having a projection 30 that may be engaged by the toe so that the attendant can raise the valve 29 with his foot when he is ready to place the quill in position.

So far as described the manner in which the invention operates is as follows:

Assume the parts to be in the position shown in Figure 3, the attendant lifts the valve 29 in the manner described, or in any other suitable way, and inserts the quill 15 as shown in Figures 6 and 7 until the lug 14 passes into the opening 13 and rests on the bottom of the groove 12. This allows the quill to clear the projection 23 of the valve 21 and thus will have no effect on the opening of the valve. Having introduced the quill as described, the operator then turns the handle 31 in a clockwise direction in Figure 6, see arrow in Figure 7, from the position shown in Figures 4, 6 and 7 to the position shown in Figure 5. This brings the abutment 19 into engagement with the projection 32 and causes the valve to be unseated. At the same time the lug 14 will pass out of register with the opening 13 into the slot 12 and interlock the quill with the casing. The water will then flow from the inlet chamber 8 through the passage 3 into the quill 15 and from thence to the sprinkler, the water pressure acting on the gasket 11 serves to prevent leakage around the quill, and the water pressure also aids in maintaining a sufficient frictional contact between the lug 14 and the casing to hold the quill against coming loose.

When it is desired to shut off the flow of water the attendant simply gives the quill a backward turn from the position shown in Figure 5 to the position shown in Figures 1, 6 and 7, whereupon the water pressure, augmented of course by the light spring 27, forces the flap valve to its seat 4 and quickly closes the passage 3, the water hammer shock being taken up by the air in the chamber 5 undergoing compression.

It is to be noted that with the parts constructed as shown in the drawings, after the quill has been turned to open the valve and permit the flow of water, a slight turn in the counterclockwise direction is sufficient to cause the abutment 19 to disengage the projection 23 and permit the valve to snap shut.

From the foregoing description, taken in connection with the accompanying drawings, it is thought the complete construction, operation and advantages of my invention will be clear to those skilled in the art to which it relates, and while I have particularly designed my invention for use in sprinkler systems it is obvious that it may be employed wherever a valve of this type may be found useful not only in water systems but in other fluid systems as well.

What I claim is:

1. In a valve device, a casing having an inlet chamber and an outlet chamber and a valve controlled passage separating said chambers, said passage having a valve seat, a fluid pressure seated valve mounted in said casing to engage said seat, and a quill insertible into said outlet chamber and means operable on rotation of said quill for unseating said valve to open said passage, the axis of said valve seat lying transversely with respect to the axis of said quill.

2. In a valve device, a casing having an inlet chamber and an outlet chamber and a valve controlled passage separating said chambers, said passage having a valve seat, a fluid pressure seated valve mounted in said casing to engage said seat, and a quill insertible into said outlet chamber and means operable on rotation of said quill for unseating said valve to open said passage, and said casing having an air chamber communicating with said inlet chamber.

3. In a valve device, a casing having an inlet chamber and a quill receiving outlet chamber and a valved passage effecting communication between said chambers, said passage having a valve seat, a valve in said casing to engage said seat under fluid pressure, said casing having an aperture opposite the valve seat, a plug in said aperture, a valve engaging spring mounted in said plug, a quill projecting into said outlet chamber and having openings in its walls thereby providing at least one abutment, said valve having a projection with which said quill abutment will engage upon rotation of said quill in one direction in order to open said valve.

4. In a valve device, a casing having an inlet chamber and a quill receiving outlet chamber and a valved passage effecting communication between said chambers, said passage having a valve seat, a valve in said casing to engage said seat under fluid pressure, said casing having an aperture opposite the valve seat, a plug in said aperture, a valve engaging spring mounted in said plug, a quill projecting into said outlet chamber and having openings in its walls thereby providing at least one abutment, said valve having a projection with which said quill abutment will engage upon rotation of said quill in one direction in order to open said valve, and means interlocking said quill with said casing while said valve is open.

5. In a valve device, a casing having an inlet chamber and a quill receiving outlet chamber and a valved passage effecting communication between said chambers, said passage having a valve seat, a valve in said casing to engage said seat under fluid pressure, said casing having an aperture opposite the valve seat, a plug in said aperture, a valve engaging spring mounted in said plug, a quill projecting into said outlet chamber and having openings in its walls thereby providing at least one abutment, said valve having a projection with which said quill abutment will engage upon rotation of said quill in one direction in order to open said valve, means interlocking said quill with said casing while said valve is open, and a fluid pressure sealing gasket between said casing and quill.

6. In valve devices, a casing having a partition dividing the same into an inlet and an outlet chamber, said partition having a passage with a valve seat, an offset flap valve in said casing to seat on said valve seat under fluid pressure, a quill fitting into said outlet chamber, and means operable after complete insertion of said quill for simultaneously interlocking said quill and opening said valve.

7. In valve devices, a casing having a partition dividing the same into an inlet and an outlet chamber, said partition having a passage with a valve seat, an offset flap valve in said casing to seat on said valve seat under fluid pressure, a quill fitting into said outlet chamber, and means operable after complete insertion of said quill for simultaneously interlocking said quill and opening said valve, said means comprising a bayonet joint between said quill and said casing, and a projection on said valve and an abutment on said quill cooperating with said projection.

8. In valve devices, a casing having a partition dividing the same into an inlet and an outlet chamber, said partition having a passage with a valve seat, a valve in said casing to seat on said valve seat under fluid pressure, a quill fitting into said outlet chamber, and means operable after complete insertion of said quill and governed by the rotation of said quill in said outlet chamber for opening said valve.

9. In valve devices, a casing having a partition dividing the same into an inlet and an outlet chamber, said partition having a passage with a valve seat, a valve in said casing to seat on said valve seat under fluid pressure, a quill fitting into said outlet chamber, and means operable after complete insertion of said quill and governed by the rotation of said quill in said outlet chamber for opening said valve, and simultaneously locking said quill to said casing.

10. In a valve device, a casing having an inlet chamber and an offset outlet chamber separated by a wall having a passage leading from the inlet chamber to the offset chamber at the side of the outlet chamber, said passage having a valve seat, a valve in said inlet chamber cooperating with said seat and a quill insertable into said outlet chamber, means holding said quill in its fully inserted position, and means operable by rotation of said quill for unseating said valve, said inlet chamber and said outlet chamber having their axes parallel and said valve seat having its axis transversed to the axes of said chambers.

WILLIAM J. McJANNET.